United States Patent [19]
Kuklo et al.

[11] Patent Number: 5,353,167
[45] Date of Patent: Oct. 4, 1994

[54] MIRROR MOUNT

[75] Inventors: Thomas C. Kuklo, Oakdale; Donald A. Bender, Dublin, both of Calif.

[73] Assignee: The United States of America as represented by the United States Department of Energy, Washington, D.C.

[21] Appl. No.: 917,244

[22] Filed: Jul. 22, 1992

[51] Int. Cl.$^5$ .................. G02B 7/198; G02B 7/182; G02B 7/02
[52] U.S. Cl. ................ 359/876; 359/819; 359/830; 359/872; 359/874; 248/485
[58] Field of Search ............. 359/871, 872, 874, 876, 359/877, 555, 557, 813, 818, 819, 811, 830, 831, 892; 248/479, 485, 487, 477, 478, 248

[56] References Cited

U.S. PATENT DOCUMENTS

| | | | |
|---|---|---|---|
| 3,588,232 | 6/1971 | Mostel | 248/487 |
| 3,596,863 | 8/1971 | Kaspareck | 359/819 |
| 3,811,665 | 5/1974 | Sellig | 267/160 |
| 3,813,089 | 5/1974 | Troeger | 267/160 |
| 3,989,358 | 11/1976 | Melmoth | 359/819 |
| 4,327,527 | 5/1982 | Seelig et al. | 51/416 |
| 4,639,081 | 1/1987 | O'Brien | 359/877 |
| 4,640,591 | 2/1987 | Cutburth | 248/487 |
| 4,705,369 | 11/1987 | Humpal | 248/487 |
| 4,763,991 | 8/1988 | Klotz, Jr. | 359/872 |
| 4,842,397 | 6/1989 | Eisler | 359/896 |
| 5,004,205 | 4/1991 | Brown et al. | 359/877 |
| 5,160,112 | 11/1992 | Pritchard et al. | 248/604 |

OTHER PUBLICATIONS

Aerotech Brochure for Gimbal Optical Mounts, AOM 105 Series and Positioning Components, AOM 110 Series.
Klinger Brochure for Optical Mounts and Supports, pp. 218 and 219.
Information Sheet for Oriel Mirror Mounts.
Lucas Aerospace Brochure for Free-Flex Pivot Frictionless Bearing.

*Primary Examiner*—Loha Ben
*Assistant Examiner*—Darryl J. Collins
*Attorney, Agent, or Firm*—Miguel A. Valdes; Roger S. Gaither; William R. Moser

[57] ABSTRACT

A unique lens or mirror mount having adjustable constraints at two key locations to allow for "X" and "Y" tilts of the mirror only. The device uses two pair of flexures of a type such that the pivots of the mirror gimble are rigidly fixed in all planes allowing the device to have zero stacking tolerance and zero wear over time.

13 Claims, 1 Drawing Sheet

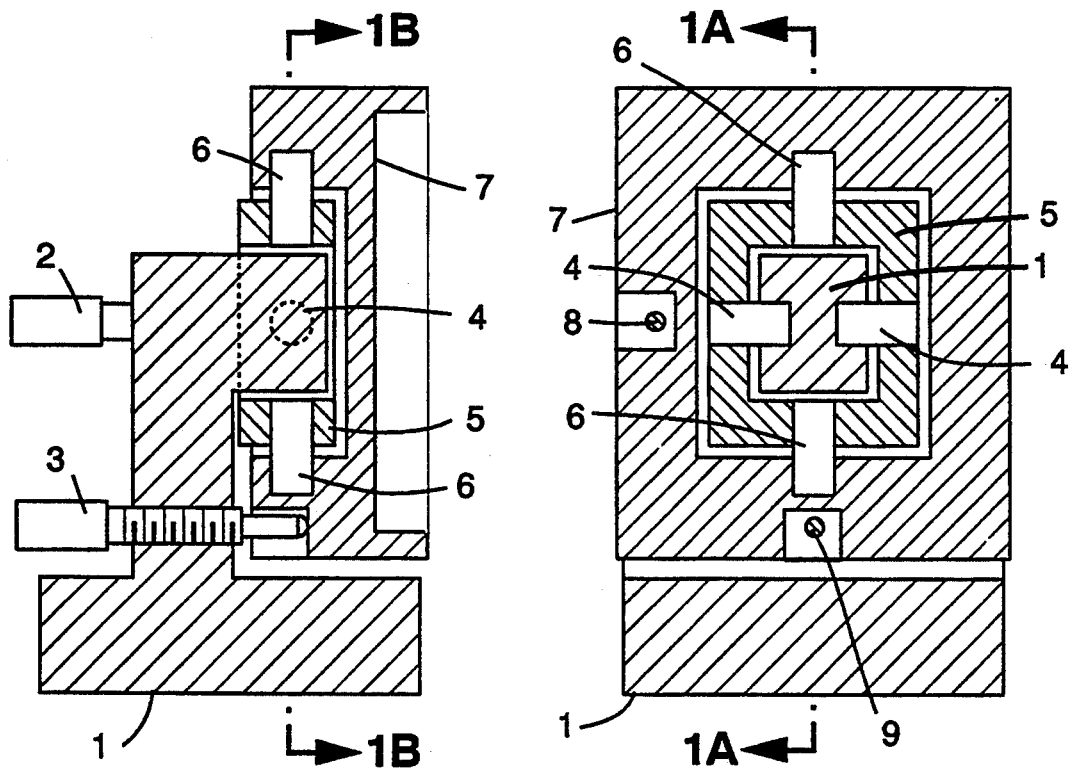
FIG. 1A
FIG. 1B
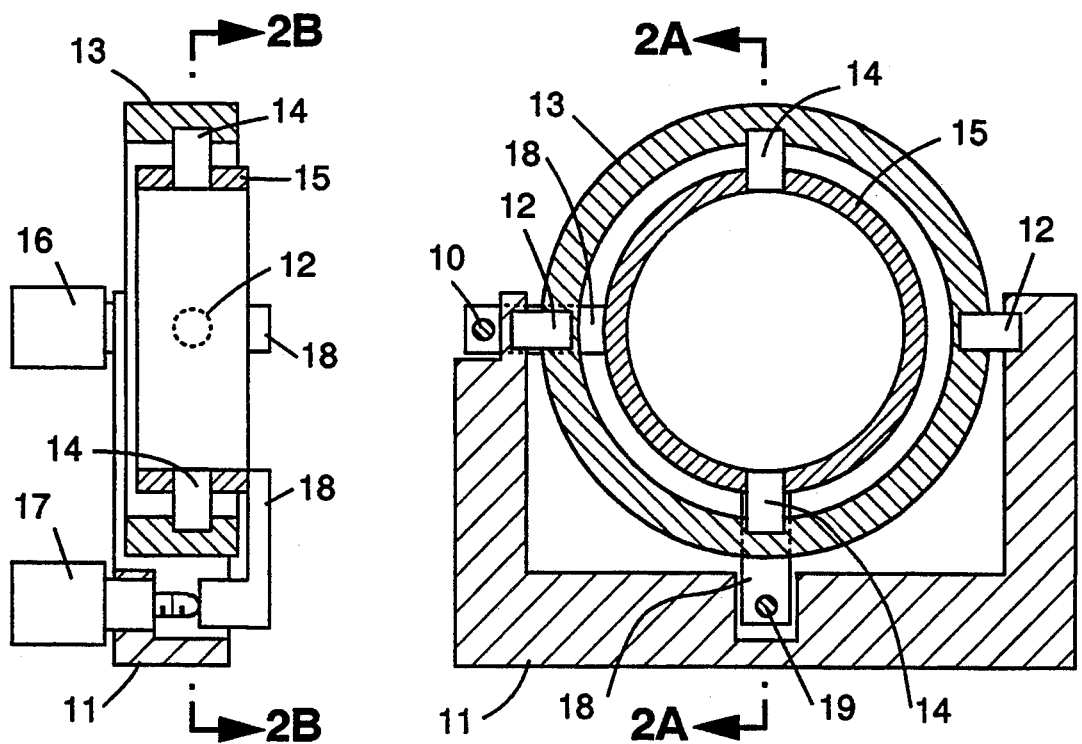
FIG. 2A
FIG. 2B

MIRROR MOUNT

BACKGROUND OF THE INVENTION

1. Field of the Invention

The United States Government has rights in this invention pursuant to Contract No. W-7405-ENG-48 between the United States Department of Energy and the University of California for the operation Lawrence Livermore National Laboratory.

This invention relates to a mechanical mount useful for mirrors or transmissive lenses. More specifically it relates to a mount which allows for extremely high precision and high bandwidth operation which is useful in laser isotope systems.

2. Description of the Related Art

In laser isotope systems, optical systems are subject to changes in temperature of the ambient environment. Even when the temperature for such an environment is controlled, excursions of several degrees are still typical. Optic holders respond to this change in environmental temperature by tilting. This may be measured in units of microradians of tilt per degree of environmental temperature change (e.g., $\mu r/c$).

In addition to this linear relationship between tilt and temperature change, thermal hysteresis occurs when after a temperature excursion an optic holder does not return to its original position. This thermal hysteresis may be characterized in terms of the difference between its initial and final tilts for a specified temperature excursion. Thermal hysteresis also has units of $\mu r/C$ but for meaningful interpretation, the magnitude of the temperature excursion must also be specified. A temperature excursion of 10C is useful for characterizing this effect. In addition to thermal hysteresis, mechanical hysteresis occurs when in response to a manual or automated command to move and then return to the original position, a residual tilt occurs.

Therefore, in laser isotope systems it is desireable to have a class of mirror or lens mounts that have characteristics including very low hysteresis ($<5$ $\mu$Rad@10° C. step), very small tilts/°C. (passive stability), the ability to set and forget or remotely activate with a variety of drivers (such as micrometers, a dc motor, a stepper motor, or a piezo motor), and the potential for high bandwidth operation. Further, the design should be cost effective, utilizing a minimum number of components, be virtually wear free and vacuum compatible.

It is the object of the present invention to meet these criteria by using a unique mirror mount structure.

SUMMARY OF THE INVENTION

In order to meet these objectives, the present invention relates to a mount structure for a mirror or lens comprising a base having a mounting block, the block having side surfaces; a first pair of flexures connected to and protruding from opposing portions of the side surfaces of the block in a first plane and defining a first axis of rotation (which plane and axis may be horizontal); a ring connected to the block via only the first pair of flexures; a second pair of flexures connected to and protruding from the ring on opposing sides of said ring and at right angles to the first plane, and defining a second (vertical) axis of rotation; acceptor means for holding a lens or mirror, connected to the ring via only the second pair of flexures; first axis driver means for rotating the acceptor means about the first axis of rotation; and vertical axis driver means for rotating the acceptor means about the second axis of rotation; wherein said first axis driver means contacts said lens acceptor means at a point along said first axis of rotation, and said second axis driver means contacts said lens acceptor means at a point along said second axis of rotation.

In one embodiment of the invention, the mounting block is surrounded by the ring, the first pair of flexures connect the block to the ring via an inner edge of the ring, and the second pair of flexures connect the ring to the acceptor means via an outer edge of the ring. In another embodiment the ring is surrounded by the mounting block, the first pair of flexures connect the block to the ring via an outer edge of the ring, and the second pair of flexures connect the ring to the acceptor means via an inner edge of the ring.

The cross section of the block, ring and acceptor means may be circular or rectangular. The driver means may include a cantilever arm connected to the acceptor means.

BRIEF DESCRIPTION OF THE DRAWINGS

The invention will be better understood by reference to the appended drawings of which, FIGS. 1A and 1B show a preferred embodiment of the mount of the invention useful with optics having reflective capability only; and FIGS. 2A and 2B show another embodiment of the mount of the invention useful with an optic which has transmissive as well as reflective capability.

DETAILED DESCRIPTION OF THE PREFERRED EMBODIMENTS

Generally, optic mounts are required for internal cavity mirror mounts and for external cavity delivery systems. Laser isotope separation systems use many optics to propagate multi-kilowatt laser beams over distances of several kilometers. For the process to be efficient, the beams must pass through numerous tight apertures. This requires that the optic mounts have microradian scale stability and controllability in the presence of ambient vibration from machinery and traffic, temperature variations due to changes in the ambient environment, and incident thermal power due to diffracted or stray light from the laser beams.

Hysteresis typically occurs when there is an adjustment overshoot requiring an immediate backing up of the adjustment driver or a thermal excursion due to the aforementioned causes. Hysteresis can be manifested as backlash and cross-talk, and both forms are highly detrimental to efficient laser isotope system operation. Therefore, laser isotope systems require that optic mounts have a very low hysteresis (i.e. less than 5 $\mu$Rad at 10° C. steps).

Two of the leading contributors to hysteresis in mounts which use ball bearings for positional stability are stacking tolerance and wear over time. Because no ball bearing is perfect and because ball bearings are omni-directional, the percentage error or defect in each ball bearing is added to the other, leading to a stacking of tolerances. Further, because ball bearings employ friction to maintain positional stability, the material of the ball bearing wears down over time, leading to increased error and greater stacking tolerance.

In the present invention, the unique structure of the invention eliminates both of these problems. Positioning two pair of flexures, each member of a pair axially aligned with the other member of the pair, so that the axis of each pair is orthoganal to the axis of the other reduces the stacking tolerance to zero because the flexures are bi-directional. Further, because the flexure uses a spring to maintain tension, there is zero wear over time.

An additional problem in laser isotope systems is passive stability. Invariably, there is some power loss that occurs when laser light is reflected off of or passes through the optic. This power transfer is manifested as heat dissipation. In traditional ball bearing mounts, this heat transfer could lead to unwanted tilts due to the expansion of the mount or bearing material. Further, lubrication is typically prohibited in an evacuated optical system because the risk of stray laser light vaporizing lubricants and contaminating optics is high. In order for unlubricated rolling or sliding bearings to function in a vacuum without sticking, dissimilar materials are required. Thus heating due to stray light or environmental changes leads to differential thermal expansion which introduces the undesired tilts. Use of flexures eliminates the need for dissimilar materials.

Further, an optical system within a laser isotope system is initially aligned manually in an enclosure at atmospheric temperature and pressure. When the enclosures are evacuated, small deflections in the structures to which the optic mounts are attached occur causing misalignment. Motors are required to realign the optical system after the enclosures are evacuated and manual access for manual adjustment is no longer available.

In addition, the use of motorized optic mounts enables the application of automated beam alignment systems for remotely controlled changes in beam pointing. In order for automated beam alignment systems to function properly the optic mounts must be largely free from crosstalk between the axes of tilt, have low hysteresis, and have tilt increments that are mush smaller than the tilt resolution that is desired for the laser beam. Traditional mounts have not satisfied these requirements simultaneously.

The use of flexures as described herein results in a highly rigid optic mount that is free from cross-talk. The added rigidity allows for the use of high speed drivers which can compensate for beam motion due to system vibration.

FIGS. 1A and 1B shows a device according to the invention with reflective capability only. It consists of a mechanical geometry with adjustable constraints at two key locations to allow for "X" and "Y" tilts of the mirror only. The stability of the device is enhanced by the use of flexural pivot (or "flexure") devices. A flexure which is preferred for use in the mirror mount of the invention is a Bendix brand "Free Flex Pivot Frictionless Bearing," available from the Bendix Corporation of Teterboro, N.J. Flexures of this type which rotate about an axis along their length have long been Known, see for example, U.S. Pat. Nos. 3,813,089, 3,811,665 and 4,327,527, the contents of which are hereby incorporated by reference. These devices allow for the pivots of the mirror gimble to be fixed rigidly in all planes allowing the device to have zero stacking tolerance and zero wear over time which is the major contributor to mount hysteresis.

The "X" and "Y" drivers are positioned in unique locations to eliminate cross talk between the tilt axis, thus allowing for high precision adjustment and the potential for high bandwidth operation. The device is structured as follows. A base structure 1 is the foundation upon which the X axis adjustor 2 and the Y axis adjustor 3 are affixed. Also affixed to the base structure 1 are two flexures 4 affixed in the horizontal plane defining a horizontal axis of rotation. A split intermediate ring 5 clamps around the free ends of the two horizontal flexures. Two additional flexures 6 are also clamped in the intermediate ring but positioned at right angles, i.e. 90 degrees from flexures 4 and project radially out from the intermediate ring. Flexures 6 define a vertical axis of rotation and the vertical plane. A means for accepting and retaining a mirror or lens such as mirror cup 7 is affixed only to the two vertical flexures 6 thus completing a monolithic assembly. The X and Y drivers, 2 and 3, make contact with the mirror cup at locations which intersect with the X and Y axes of rotation, at contact points 8 and 9 respectively, thus allowing for very low crosstalk between axes and minimum sliding action between drivers and mirror cup.

The device is assembled in such a fashion that the flexures are preloaded giving a total tilt range of +/− 3 degrees. This device is scaleable from 1 inch mirrors to 30 inch mirrors with currently available flexures.

The device of FIGS. 2A and 2B is identical in function to that shown in FIGS. 1A and 1B except the flexures are mounted externally to the mirror. In FIGS. 2A and 2B a cradle structure 11 has affixed to it two flexures 12 mounted on a horizontal axis. Flexures 12 project radially inwardly and attach to a split intermediate ring 13. Attached to intermediate ring 13 are two additional flexures 14 (defining a vertical axis of rotation) affixed 90 degrees from the horizontal flexures 12. These flexures also project radially inwardly and are affixed to a mirror cup 15. This completes the monolithic assembly. The X and Y drivers, 16 and 17, make contact with the mirror cup at locations 10 and 19, which locations are along the X and Y axes of rotation respectively, utilizing cantilever beams 18 which connect to the mirror cup 15 thus allowing for very low crosstalk between the axes and minimum sliding action between drivers and mirror cup.

The preferred embodiments described herein are intended to be illustrative and not limiting with respect to the scope of the present invention. Those skilled in the present art will understand that many variations of the invention can be made which fall within the scope of the appended claims. For instance, while it is preferred that the axes of the apparatus be generally disposed horizontally and vertically, what is more important is that the two axes be at right angles to one another, and that the drivers contact the acceptor means along those axes.

What is claimed is:
1. A mount structure for a mirror or lens comprising:
  (a) a base having a mounting block, said block having side surfaces;
  (b) a first pair of flexures connected to and protruding from opposing portions of said side surfaces of said block in a first plane and defining a first axis of rotation;
  (c) a ring mounted to said block via only said first pair of flexures;
  (d) a second pair of flexures connected to and protruding from said ring on opposing sides of said ring and at right angles to said first plane, and defining a second axis of rotation;
  (e) acceptor means for holding a lens or mirror, mounted to said ring via only said second pair of flexures;

(f) first axis driver means for rotating said acceptor means about said first axis of rotation, said first axis driver means contacting said acceptor means at a point along said first axis of rotation; and (g) second axis driver means for rotating said acceptor means about said second axis of rotation, said second axis driver means contacting said acceptor means at a point along said second axis of rotation.

2. A mount structure as claimed in claim 1 wherein said first plane is horizontal and said first axis of rotation is horizontal, and wherein said second plane is vertical and said second axis of rotation is vertical.

3. A mount structure for a mirror or lens comprising:
(a) a base having a mounting block, said block having side surfaces;
(b) a first pair of flexures connected to and protruding from opposing portions of said side surfaces of said block in a first plane and defining a first axis of rotation;
(c) a ring mounted to said block via only said first pair of flexures;
(d) a second pair of flexures connected to and protruding from said ring on opposing sides of said ring and at right angles to said first plane, and defining a second axis of rotation;
(e) acceptor means for holding a lens or mirror, mounted to said ring via only said second pair of flexures;
(f) first axis driver means for rotating said acceptor means about said first axis of rotation, said first axis driver means contacting said acceptor means at a point along said first axis of rotation; and
(g) second axis driver means for rotating said acceptor means about said second axis of rotation, said second axis driver means contacting said acceptor means at a point along said second axis of rotation wherein said mounting block is surrounded by said ring, said first pair of flexures connect said block to said ring via an inner edge of said ring, and said second pair of flexures connect said ring to said acceptor means via an outer edge of said ring.

4. A mount structure as claimed in claim 3 wherein said acceptor means comprises a mirror cup, further including a fully reflective mirror mounted in said mirror cup.

5. A mount structure for a mirror or lens comprising:
(a) a base having a mounting block, said block having side surfaces;
(b) a first pair of flexures connected to and protruding from opposing portions of said side surfaces of said block in a first plane and defining a first axis of rotation;
(c) a ring mounted to said block via only said first pair of flexures;
(d) a second pair of flexures connected to and protruding from said ring on opposing sides of said ring and at right angles to said first plane, and defining a second axis of rotation;
(e) acceptor means for holding a lens or mirror, mounted to said ring via only said second pair of flexures;
(f) first axis driver means for rotating said acceptor means about said first axis of rotation, said first axis driver means contacting said acceptor means at a point along said first axis of rotation; and
(g) second axis driver means for rotating said acceptor means about said second axis of rotation, said second axis driver means contacting said acceptor means at a point along said second axis of rotation wherein said ring is surrounded by said mounting block, said first pair of flexure connected said block to said ring via an outer edge of said ring, and second pair of flexures connect said ring to said acceptor means via an inner edge of said ring.

6. A mount structure as claimed in claim 5 wherein said acceptor means comprises a mirror cup, further including a partially reflective, partially transmissive mirror mounted in said mirror cup.

7. A mount structure as claimed in claim 5 further including a lens mounted in said acceptor means.

8. A mount structure for a mirror or lens comprising:
(a) a base having a mounting block, said block having side surfaces;
(b) a first pair of flexures connected to and protruding from opposing portions of said side surfaces of said block in a first plane and defining a first axis of rotation;
(c) a ring mounted to said block via only said first pair of flexures;
(d) a second pair of flexures connected to and protruding from said ring on opposing sides of said ring and at right angles to said first plane, and defining a second axis of rotation;
(e) acceptor means for holding a lens or mirror, mounted to said ring via only said second pair of flexures;
(f) first axis driver means for rotating said acceptor means about said first axis of rotation, said first driver means including a cantilever arm which contacts said acceptor means at a point along said first axis of rotation; and
(g) second axis driver means for rotating said acceptor means about said second axis of rotation, said second driver means including a cantilever arm which contacts said acceptor means at a point along said second axis of rotation.

9. A mount structure as claimed in claim 8 wherein said first plane is horizontal and said first axis of rotation is horizontal, and wherein said second plane is vertical and said second axis of rotation is vertical.

10. A mount structure as claimed in claim 8 wherein said ring is surrounded by said mounting block, said first pair of flexures connect said block to said ring via an outer edge of said ring, and said second pair of flexures connect said ring to said acceptor means via an inner edge of said ring.

11. A mount structure as claimed in claim 8 wherein said acceptor means comprises a mirror cup, further including a fully reflective mirror mounted in said mirror cup.

12. A mount structure as claimed in claim 8 wherein said acceptor means comprises a mirror cup, further including a partially reflective, partially transmissive mirror mounted in said mirror cup.

13. A mount structure as claimed in claim 8 further including a lens mounted in said acceptor means.

* * * * *